Oct. 30, 1945.   H. P. PHILLIPS   2,387,854
PISTON RING
Filed Jan. 8, 1943

INVENTOR.
Harold P. Phillips
BY
Earl D Chaffee
ATTORNEYS.

Patented Oct. 30, 1945

2,387,854

UNITED STATES PATENT OFFICE 2,387,854

PISTON RING

Harold P. Phillips, Hastings, Mich., assignor to Hastings Manufacturing Company, Hastings, Mich., a corporation of Michigan Application January 8, 1943, Serial No. 471,645

5 Claims. (Cl. 309—44)

The main objects of this invention are:

First, to provide a piston ring which is well adapted for use as a compression ring in internal combustion engines.

Second, to provide a piston ring of the type having a cant or twist in whch the top and bottom sides of the ring are of full radial width of the ring and present unbroken surfaces to the walls of the piston ring groove.

Third, to provide a piston ring of the twisted or canted type which is not likely to be broken in installation or use and in which there are no recesses for the trapping of gas under pressure affecting the action of the ring.

Fourth, to provide a piston ring having these advantages which is very durable.

Fifth, to provide an improved piston ring of the twisted or canted type which may be very economically produced with uniform characteristics.

Objects relating to details and economies of the invention will appear from the description to follow. The invention is defined and pointed out in the claims.

A preferred embodiment of the invention is illustrated in the accompanying drawing, in which.

Figure 1:
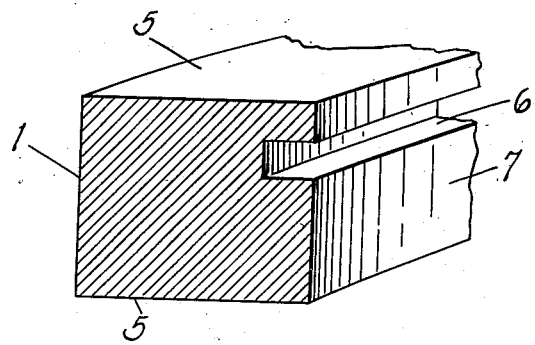
Fig. 1 is an enlarged fragmentary perspective view of the piston ring of my invention.

The piston rings of my invention are especially desirable for use in compression rings or for installation in the compression ring grooves of an internal combustion engine although, it will be understood, that they may be used in the second scraper ring groove of a piston.

The piston ring 1 in the illustrated embodiment of my invention is preferably formed of cast iron and has inherent resilient expansibility, the ring being of the split type.

It will be understood that in the accompanying drawing I have not attempted to illustrate my invention in the matter of exact proportions or the clearances of the piston 2 relative to the cylinder wall 3 or the clearance of the piston ring 1 relative to the walls of the piston ring groove 4.

The piston ring of my invention in its preferred embodiment, as illustrated, is of uniform axial thickness and of uniform radial width. Its side walls 5 are flat and unbroken throughout the entire axial width thereof.

The piston ring is formed preferably by casting in any suitable manner and the desired steps of cutting out the gap and grinding or machining are performed and thereafter the continuous kerf or slot 6 is cut in the inner periphery 7 of the ring, this kerf or slot being above the axial center of the ring but substantially spaced from its upper side.

Figure 2:
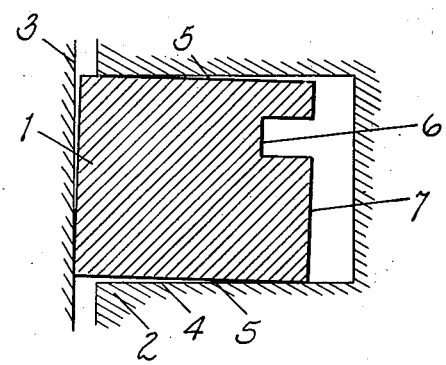
Fig. 2 is a fragmentary section showing the relation of the piston ring of my invention to the piston ring groove of a piston and to the cylinder.
Figure 3:
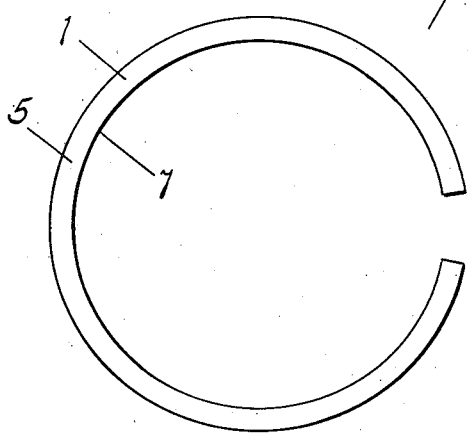
Fig. 3 is a side view of the ring of my invention, no attempt being made to show the cant or twist thereof.

The cutting or forming of this slot or kerf results in such unbalancing of the stresses within the ring that it assumes and retains a permanent upward cant as is illustrated in Fig. 2. This is due to the fact that when the expanded ring 1 of Fig. 3 is compressed into the ring groove 4 of the piston 2 for insertion into the cylinder 3, the portion of the ring 1 adjacent its inner periphery is under a considerable pressure tending to force the ring outwardly. By cutting the kerf 6 in the inner periphery of the upper half of the ring, this pressure is reduced more in the upper half of the ring than in its lower half which results in the tilting of the lower part of the ring outwardly as shown in Fig. 2.

Applicant is aware that portions of a ring have been cut away so that the ring assumes a twisted or canted form but these cut-away portions commonly located on a corner of the ring result in forming gas pressure pockets which affect the performance of the ring, reducing the wear surface of the ring.

The kerf or cut 6 in the applicant's ring is substantially spaced from the adjacent side of the ring, leaving a complete inner land in axial alinement with the kerf between the kerf and the adjacent side of the ring. With the kerf 6 so disposed the upper wearing surface of the ring is permitted to extend the full radial width of the ring, thereby increasing the life and improving the operation of the same.

Another disadvantage of the rings having cant or twist producing recesses in their sides is that these recesses serve to collect carbon, thus further increasing the wear factor. Should carbon collect in the kerf or slot 6 in the applicant's ring, there is no objectionable result.

The slot 6 is sufficiently spaced from the adjacent side of the ring so that fragile parts do not result. A practical width of this land above the slot, vertically is in the neighborhood of .024 of an inch and it may range from .015 to .028 with satisfactory results. The width of the groove may satisfactorily be in the neighborhood of .024 of an inch.

The radial thickness of compression rings now commonly in use are in the neighborhood of .140 to in the neighborhood of .200. The groove in such rings, with satisfactory results, may be in the neighborhood of one-fourth to one-third of the radial thickness. Thus in a ring of .140 in radial thickness, the slot or groove may desirably be in the neighborhood of .040 in depth. Of course, the depth of the groove depends on the degree of cant or twist in the desired ring.

The rings of my invention may be installed without danger of breakage—that is, they are not fragile as compared to ordinary cast iron rings. The wear on the walls of the piston ring groove is the same as in the common type of compression ring not having the cant or twist and there is no recess to collect carbon or to provide pockets for gas under pressure.

As stated, I have not attempted to illustrate the ring of my invention in proportion or clearances as the sizes of rings and clearances are well understood by those skilled in the art.

Having thus described my invention, what I claim as new and desire to secure by Letters Patent, is:

1. A split expansible resilient piston ring of uniform axial thickness and of uniform radial width, the opposite sides of said ring constituting wearing surfaces for said ring, said ring having a continuous kerf or slot cut in the inner periphery thereof above its axial center but in substantially spaced relation to its upper side, and in axial alignment with the inner portion of the wearing surface of said upper side, whereby the ring assumes and retains a permanent upward cant when compressed in a piston ring groove.

2. A cast iron split expansible resilient piston ring of substantially rectangular shape in cross section, the opposite sides of said ring constituting wearing surfaces for said ring, said ring having a continuous kerf or slot in the inner periphery thereof at one side its axial center but in substantially spaced relation to its side adjacent the slot, the inner portion of the wearing surface of the side adjacent said slot being in axial alinement with said slot, the said slot resulting in a permanent cant in the ring when compressed in a piston ring groove.

3. A split expansible resilient piston ring having parallel flat sides of the full radial width of the ring and having a continuous kerf or slot in the inner periphery thereof at one side of its axial center but in substantially spaced relation to its side adjacent the slot, the inner surface of the ring between said slot and the adjacent side of the ring being approximately at right angles to such side of the ring.

4. An expansible resilient piston ring having parallel flat sides of the full radial width of the ring, the opposite sides of said ring constituting wearing surfaces for said ring, said ring having a continuous kerf or slot in the inner periphery thereof at one side of its axial center but in substantially spaced relation to its side adjacent the slot, the inner portion of the wearing surface of the side adjacent said slot being in axial alinement with said slot.

5. A split expansible piston ring having wearing surfaces on the opposite sides thereof and having a kerf or slot in the inner periphery thereof at one side of its axial center but in substantially spaced relation to its side adjacent the slot, the inner portion of the wearing surface of the side adjacent said slot being in axial alinement with said slot, the resultant of said slot or kerf being a permanent cant in the ring when compressed in a piston ring groove.

HAROLD P. PHILLIPS.